(12) United States Patent
Johannesson

(10) Patent No.: US 6,357,387 B1
(45) Date of Patent: Mar. 19, 2002

(54) TEATCUP SUPPLYING AND RETRIEVING DEVICE AND AN AUTOMATIC MILKING APPARATUS THEREFOR

(75) Inventor: Leif Börje Johannesson, Tumba (SE)

(73) Assignee: Alfa Laval Agri AB, Tumba (SE)

( * ) Notice: Subject to any disclaimer, the term of this patent is extended or adjusted under 35 U.S.C. 154(b) by 0 days.

(21) Appl. No.: 09/485,243
(22) PCT Filed: Jul. 17, 1998
(86) PCT No.: PCT/SE98/01397
§ 371 Date: Feb. 18, 2000
§ 102(e) Date: Feb. 18, 2000
(87) PCT Pub. No.: WO99/07212
PCT Pub. Date: Feb. 18, 1999

(30) Foreign Application Priority Data

Aug. 8, 1997 (SE) ................................ 9702902

(51) Int. Cl.[7] ................................ A01J 5/017
(52) U.S. Cl. ................ 119/14.47; 119/14.48; 119/14.1
(58) Field of Search ............ 119/14.47, 14.48, 119/14.51, 14.13, 14.24, 14.27, 14.29, 14.1, 14.18

(56) References Cited

U.S. PATENT DOCUMENTS 2,812,742 A * 11/1957 Millar
3,388,689 A 6/1968 Patrick
3,973,520 A * 8/1976 Flocchini ............... 119/14.08
4,735,172 A 4/1988 Wahlström et al.
5,069,160 A 12/1991 Street et al.
5,572,947 A * 11/1996 Larson et al. .......... 119/14.51
5,950,561 A * 9/1999 Redmond et al. ....... 119/14.45

FOREIGN PATENT DOCUMENTS

| EP | 0300115 | 1/1989 |
| EP | 0535755 | 4/1993 |
| GB | 2258382 | 2/1993 |

* cited by examiner

Primary Examiner—Michael J. Carone
Assistant Examiner—Yvonne R. Abbott
(74) Attorney, Agent, or Firm—Weingarten, Schurgin, Gagnebin & Lebovici LLP

(57) ABSTRACT

A teatcup supplying and retrieving device (4) has a teatcup supplying member (5) and at least one teatcup (10) connected to a tubing (11). The teatcup is provided with a teat entry end (19) having a surface defining an inlet opening (20) for a teat. The teatcup (10) is displaceable from a first position to a second position, in which the teat entry end (19) is directed differently from that of the first position, wherein the teatcup (10) is freely displaceable in relation to the teatcup supplying member (5) during displacement between the first and second positions. The displacement is at least initiated by a displacement device (8) controlled by a controller. Furthermore, there is provided an automatic milking apparatus having a milking robot provided with a robot arm (3) to be used in conjunction with such a teatcup supplying and retrieving device (4).

39 Claims, 8 Drawing Sheets

Figure 1A:
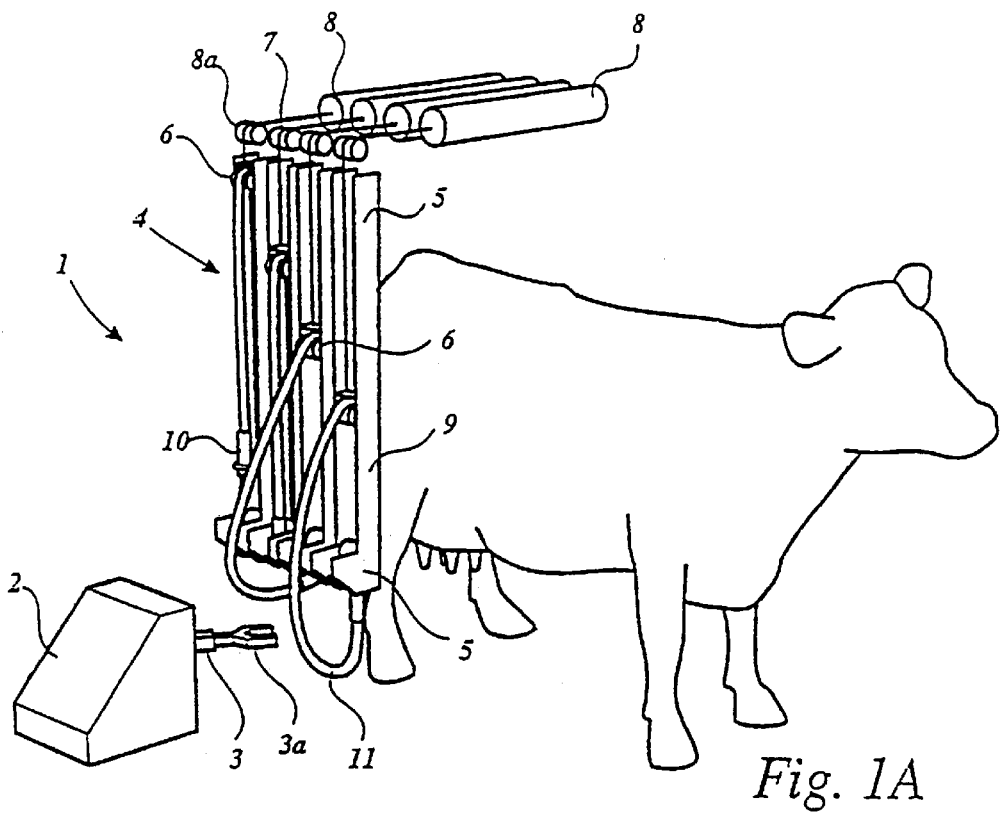

TEATCUP SUPPLYING AND RETRIEVING DEVICE AND AN AUTOMATIC MILKING APPARATUS THEREFOR

TECHNICAL FIELD

The present invention relates to a teatcup supplying and retrieving device comprising a teatcup supplying member and at least one teatcup connected to a tubing, said teatcup being provided with a teat entry end having a surface defining an inlet opening for a teat.

It also relates to an automatic milking apparatus comprising a milking robot arm provided with such a teatcup supplying and retrieving device.

Such a device and an apparatus are known from EP-A-0 213 660

Another such apparatus is known from WO 93/00001

OBJECT OF THE INVENTION

Milking robots provided with a teatcup supplying and retrieving device have been developed during the last twenty years. There are kinds known, where all the teatcups are constantly held in an upright position, such that the teat entry end is kept upwards, see e.g. U.S. Pat. No. 4,010,714 or EP-A-0 536 837. This is disadvantageous, as dirt may fall or flow into the teatcup when kept in a storage position.

Other milking robots are provided with a teatcup supplying and retrieving device in the form of a separate washing and/or storage magazine. in which the teat entry end is kept downwards, see e.g. EP-A-0 213 660 or WO 93/00001. On fetching the teatcup, the milking robot arm must turn the teatcup such that it takes an upright position. This is also disadvantageous, as it requires a complicated design of the milking robot arm.

It is, accordingly, an object of the invention to provide a teatcup supplying and retrieving device and a milking robot, which overcome these disadvantages.

SUMMARY OF THE INVENTION

This has been solved by a teatcup supplying and retrieving device of the initial defined kind, wherein said teatcup is displaceable from a first position to a second position, in which said teat entry end is directed differently from that of the first position, wherein said teatcup is freely displaceable in relation to said teatcup supplying member during displacement between said first and second positions, said displacement being at least initiated by a displacement means controlled by a control means.

It has also been solved by milking robot of the initial defined kind, wherein the milking robot arm is adapted to fetch at least one teatcup from said teatcup supplying member, the teatcup being at its second position, and to attach it onto a teat of an animal.

Hereby, it is made possible to store the teatcups in a position such that the teat entry end is kept in a direction other than upwards, i.e. the risk is less for contamination of the interior of the teatcup.

Preferably, said teat entry end is directed substantially downwards in said first position. Furthermore, it is preferred that said teat entry end is directed substantially upwards in said second position. Hereby is achieved that the teatcup can be fetched by the robot arm, while the teatcup is in an upright position, which allows for a simple design of the robot arm, which in turn reduces the manufacturing costs therefor.

Suitably, said teatcup supplying member comprises a displacement limiting means for limiting the movement of the teatcup. Hereby, a turning area is defined.

Preferably, said displacement limiting means comprises a stop member at said first position. Hereby, a turning point is defined.

Suitably, said movement limiting means comprises a guide means adapted to guide said teatcup towards said first position. Furthermore, said guide means comprises a pair of substantially parallel guide members.

Preferably, said tubing is allowed to extend between and through said pair of guide members during displacement of the teatcup between said first and second positions. Hereby, turning of the teatcup including the tubing is facilitated.

Suitably, said guide members are inclined in relation to the horizontal plane, and are arranged to allow said teatcup to perform a sliding movement along an upper surface of said guide members. Hereby is achieved that the teatcup is allowed to slide along the guide members towards said stop member.

Preferably, said guide members are arranged to allow said teatcup to perform a sliding movement along a lower surface of said guide members. Hereby, a guidance is achieved during teatcup retrieval.

Preferably, said teatcup comprises a flange means adapted to be in contact with said displacement limiting means while being displaced between said first and second positions. Hereby, a turning axis is defined.

Said flange means comprises at least one flange member forming a substantially annular flange. This allows for easy manufacturing.

Preferably, said tubing is associated with said displacement means. Hereby, displacement of the teatcup may be performed by displacing the tubing.

Suitably, said teatcup is displaceable between said first and second positions by means of a tubing linking means connectible to said displacement means, which linking means is arranged between the ends of said tubing, said tubing being connected, at its end opposite to the end connected to the teatcup, to a milk line connection point, movement of said linking means substantially towards said fluid connection point causing the teatcup to be displaced downwards. Displacement of the teatcup is thus achieved with less risk for disturbance.

Preferably, said tubing linking means comprises a pulley, about which said tubing is adapted to run. Hereby, a smooth displacement of the tubing and the teatcup is achieved.

Preferably, a disengagement of an engagement member of said displacement means causes gravity to displace said teatcup. Hereby, displacement of the teatcup may be performed without use of external power.

Alternatively, operation of a driving means of said displacement means causes displacement of said teatcup, said operation being controlled by said control means. Hereby, a controlled displacement of the teatcup may be performed with external power.

In order to perform said controlled displacement, said driving means comprises a pneumatic cylinder or a pneumatic vane motor.

Preferably, said teatcup is displaceable from an upper position to a position located substantially below therefrom, e.g. to said first position. Hereby is achieved a possibility of moving the teatcup from e.g. a storage place or a washing rack.

Suitably, said teatcup is adapted to be retrieved to said upper position by means of said displacement means after a signal from said control means. The signal may be initiated manually by pressing a push button, or automatically by e.g. a sensor sensing a ceasing milk flow, such as a milk flow sensor of a temperature sensor.

The automatic milking apparatus further comprises a milking stall defining an animal space for receiving at least one animal, and a milking robot arranged at a longitudinal side of said milking stall in such a way that a robot arm of said milking robot is allowed to move into said animal space, said teatcup supplying and retrieving device being arranged at the same longitudinal side of the milking stall as the milking robot. Hereby easy fetching of the teatcups by the milking robot arm is achieved.

DRAWING SUMMARY

Figure 1B:
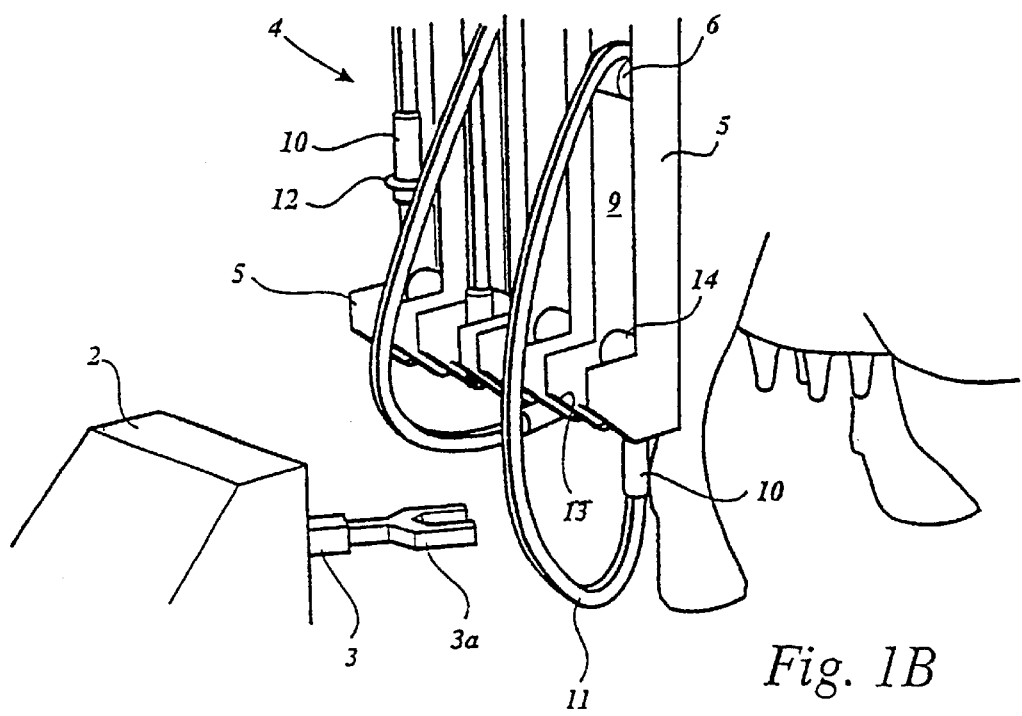
Figure 2A:
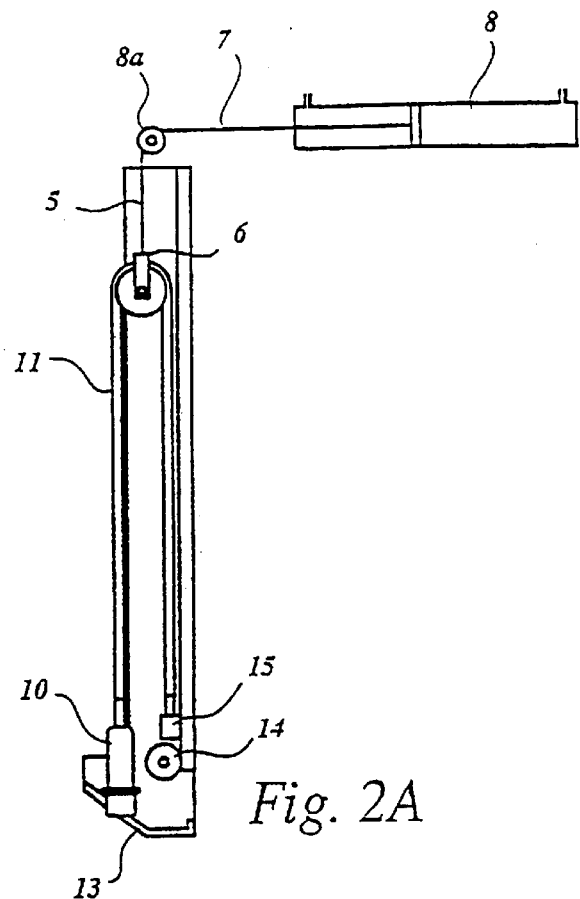
Figure 2B:
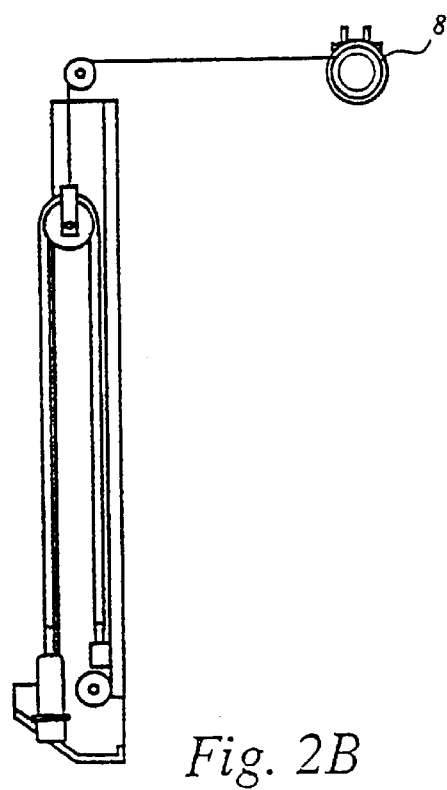
Figure 3A:
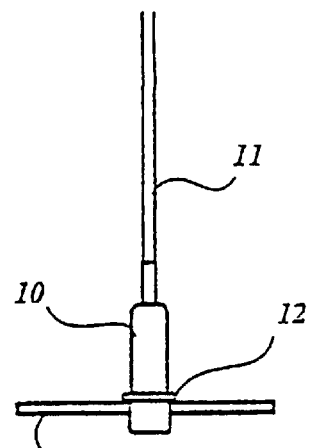
Figure 3B:
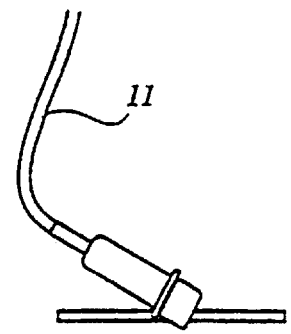
Figure 3C:
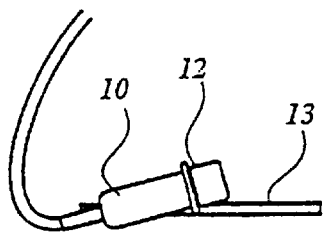
Figure 3D:
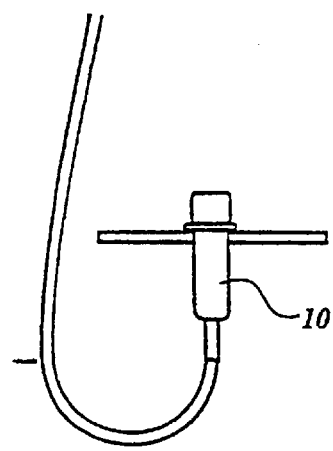
Figure 4A:
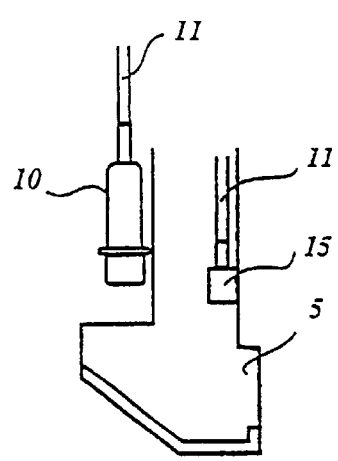
Figure 4B:
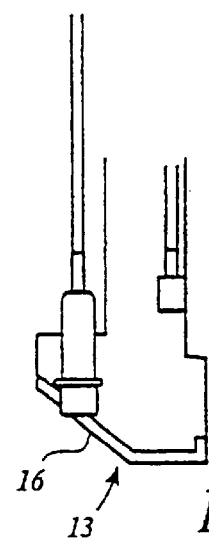
Figure 4C:
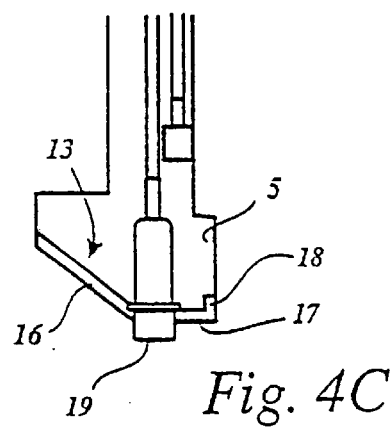
Figure 4D:
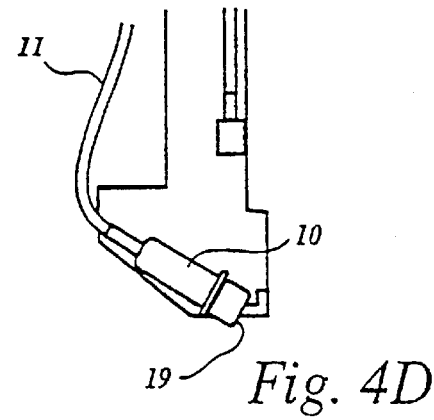
Figure 4E:
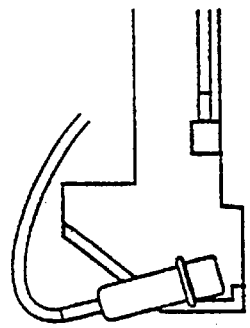
Figure 4F:
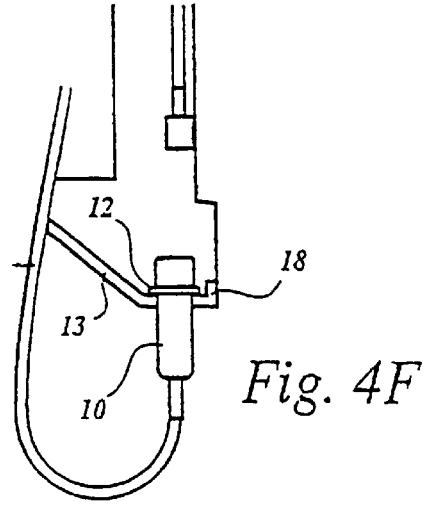
Figure 5:
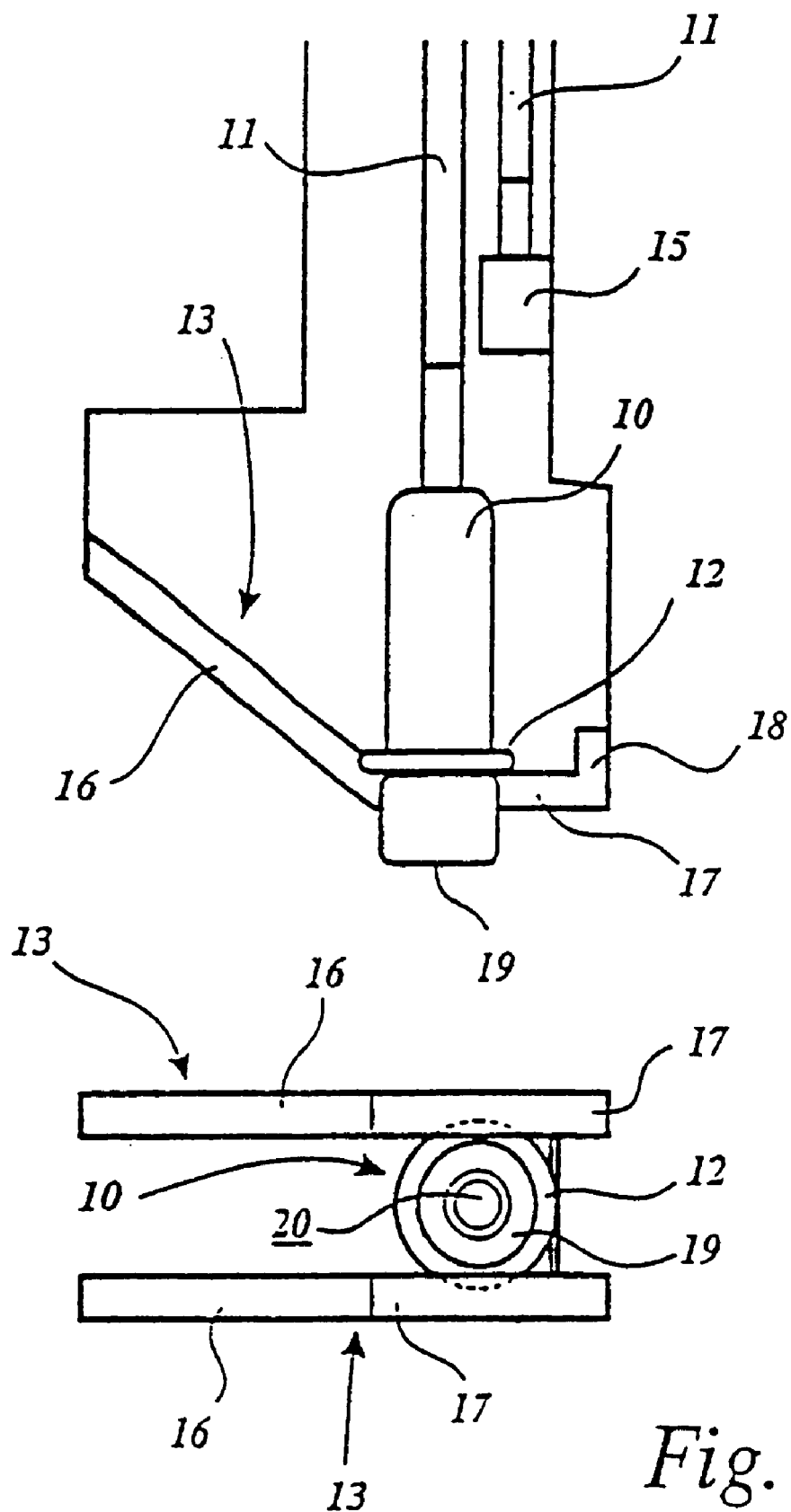
Figure 6:
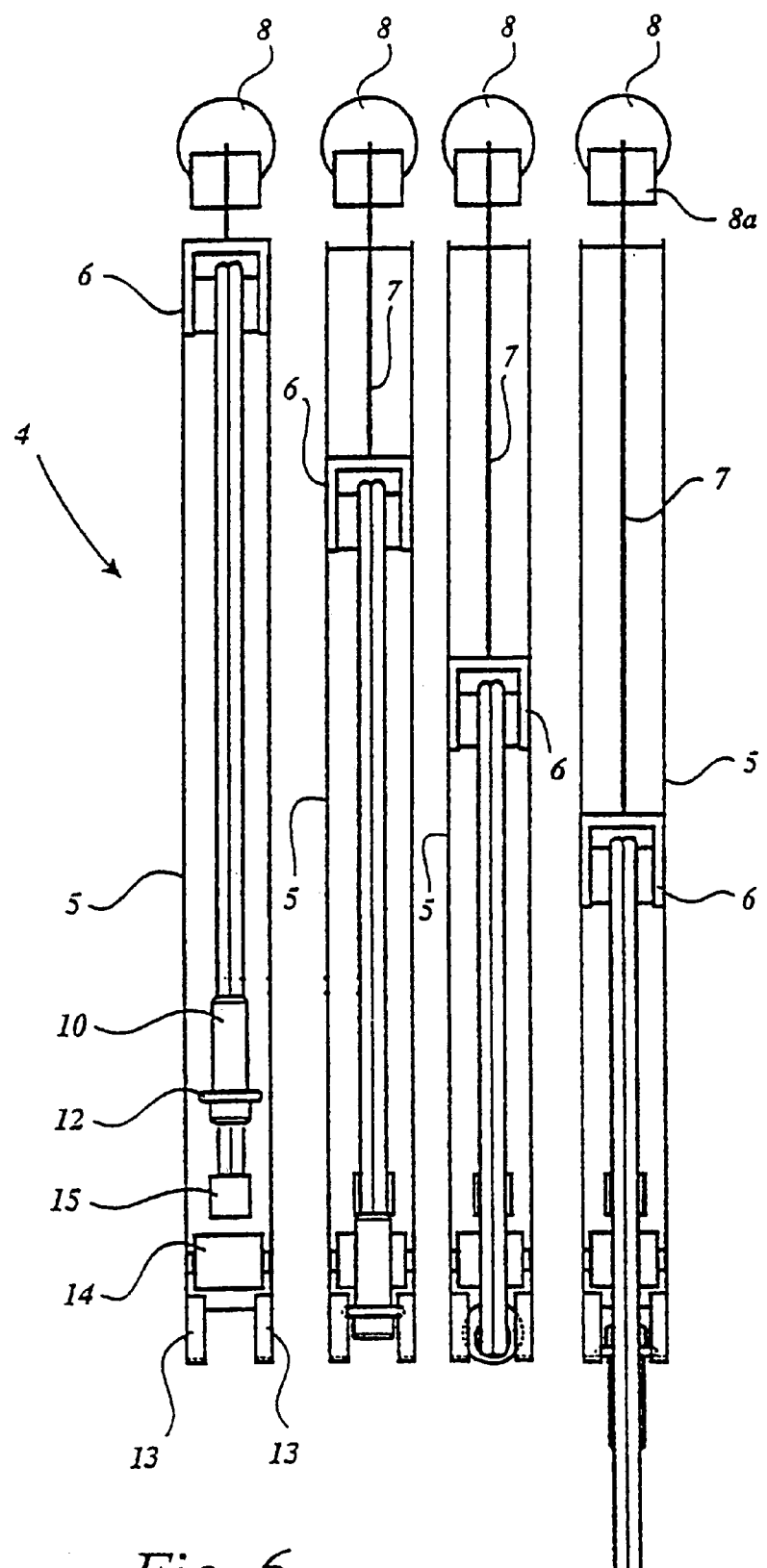
Figure 7:
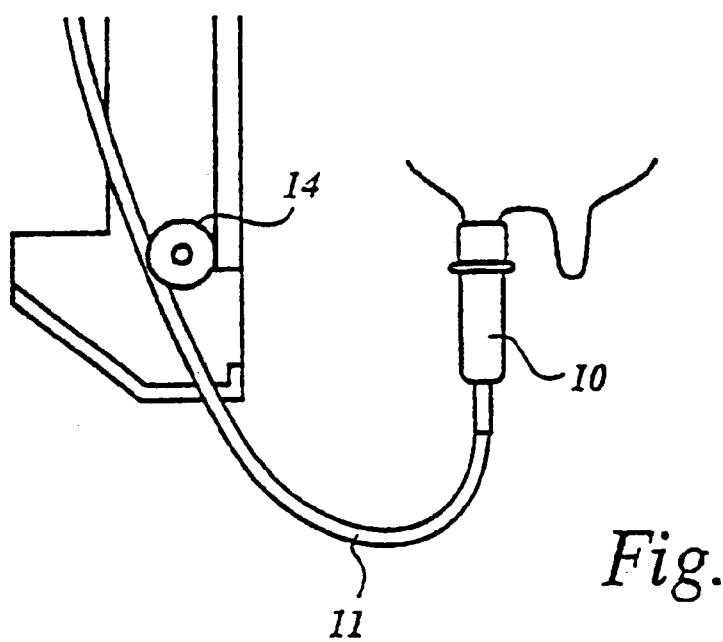
Figure 8A:
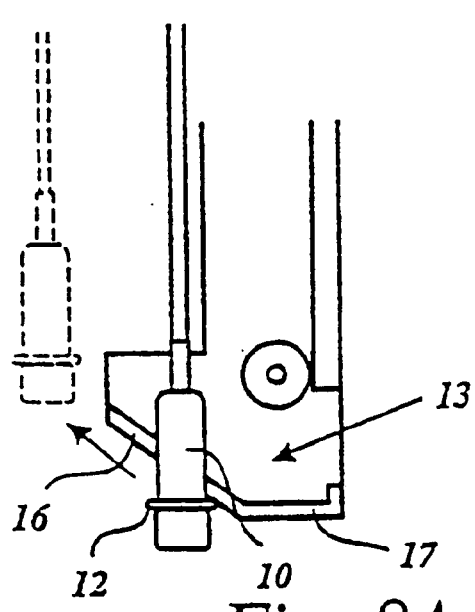
Figure 8B:
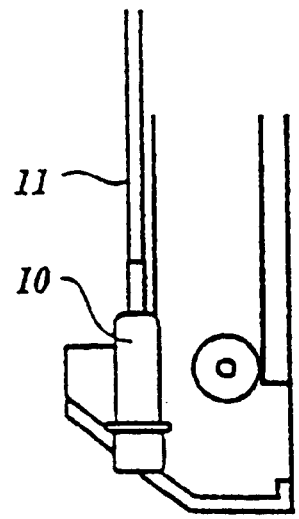
Figure 9:
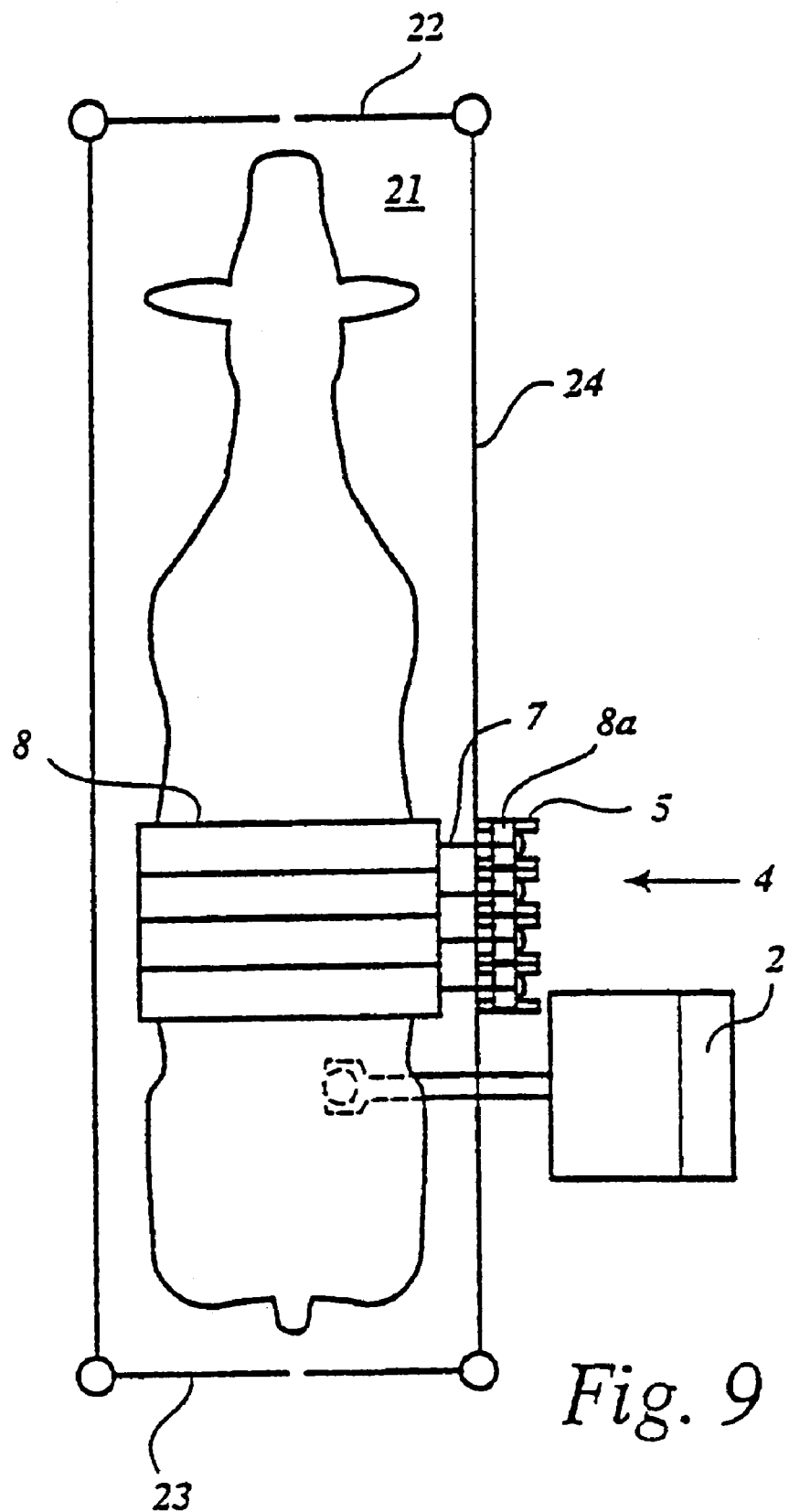

The invention will now be described in more detail with reference to the accompanying drawings, in which FIGS. 1A and 1B are perspective views of an automatic milking apparatus comprising a teatcup supplying and retrieving device, FIG. 2A is a cross-section through the teatcup supplying and retrieving device comprising a driving means, FIG. 2B shows the same device as in FIG. 2A with an alternative driving means, FIGS. 3A to 3D illustrate the principle of turning of a teatcup by gravity, FIGS. 4A to 4F illustrate turning of a teatcup in the teatcup supplying and retrieving device according to the invention, FIG. 5 illustrates a teatcup in a supply position, as seen from the side and from underneath, FIG. 6 is a front view. of the teatcup supplying and retrieving device according to the invention, FIG. 7 illustrates a teatcup attached to a teat, FIG. 8A illustrates retraction of a teatcup, FIG. 8B illustrates the position of a teatcup during rinsing thereof, and FIG. 9 shows a milking stall from above.

DETAILED DESCRIPTION OF THE INVENTION

FIG. 1A illustrates a cow to be milked by an automatic milking apparatus 1, comprising a milking robot 2 with a robot arm 3 provided with a gripper 3a. Bars to protect and suspend the equipment and to form a milking stall have been omitted for better understanding of the apparatus. The automatic milking apparatus 1 furthermore comprises a teatcup supplying and retrieving device 4 provided with four teatcup supplying members 5. Please refer to FIG. 1B for a magnification.

Each teatcup supplying member is provided with a pulley 6. Each pulley 6 is connected by a cord 7 to a driving means 8 in the form of a pneumatic cylinder or an air spring, via a link roll 8a, which in turn is connected to a source of pressure or vacuum (not shown). During operation of the cylinder 7, the pulley 6 is caused to move upwards or downwards in a guide member 9 of the teatcup supplying member 5.

A teatcup 10 connected to a tubing 11, consisting of a milk tube and a pulsation tube, is arranged in each teatcup supplying member 5. The tubing 11 is arranged to run over the pulley 6.

The teatcup 10 is provided with an annular flange 12, which is adapted to interact with a pair of flanges 13. During turning of the teatcup 10, the tubing 11 is allowed to extend through an opening between the flanges 13, for forming a smooth curve.

A guide roller 14 is provided to guide the tubing during attachment of a teatcup 10 onto a teat of the cow and subsequent detachment thereof, in order to avoid wear of the tubing against edges.

FIG. 2A illustrates how the tubing 11 is connected at one end to the teatcup 10, runs over the pulley 6 and is connected at its opposite end to a fluid connection point 15 in the form of a pair of nipples (not shown), which in turn connect to a milk line and a vacuum line, respectively (not shown).

The cord 7 is moved over the link roll 8a by a piston in the pneumatic cylinder 8.

FIG. 2B illustrates the use of an alternative driving means 8, namely a pneumatic vane motor as disclosed in WO 95/07607, which may alternatively be driven by air under pressure.

It should be noted that for causing the pulley 6 to move downwards, it is not needed to actively drive the driving means. On the contrary, it is possible to disengage the motor by e.g. allowing atmospheric air to be introduced into the working chambers on each side of the piston of the pneumatic cylinder. Regarding the vane motor, reference is made to WO 95/07607.

In FIGS. 3A to 3D, the principle of turning of a teatcup about a pair of horizontal flanges 13 is shown.

FIG. 3A illustrates a teatcup supported on its annular flange 12 on the pair of flanges 13, of which only one is shown for clarity reasons.

FIG. 3B illustrates how the tubing bends when it is slackened, which causes the teatcup to turn about the annular flange 12 resting on the pair of flanges 13, due to gravity acting on the tubing and the teatcup. Further slackening of the tubing will cause the teatcup 12 to turn even further (FIG. 3C).

FIG. 3D shows the teatcup 10, when completely turned.

FIGS. 4A to 4F illustrate the principle of turning of the teatcup 10 about the pair of flanges 13 of the teatcup supplying and retrieving device 4 according to the invention.

In FIG. 4A, the teatcup is in its retracted position.

In FIG. 4B, the teatcup rests and slides against an inclined portion 16 of the pair of flanges 13.

In FIG. 4C, the teatcup 10 rests on its annular flange 12 against a horizontal portion 17 and a vertical portion 18 of the pair of flanges 13, which both form a stop member for preventing further downward or sideward movement of the teatcup 10, so that a rotational movement can be initiated. A teat entry end 19 of the teatcup 10 is directed downwards.

In FIG. 4D, a rotational movement of the teatcup 10 has been initiated, so that the teat entry end 19 is inclined downwards. In FIG. 4E, the teatcup has performed a further rotation, the teat entry end 19 being inclined upwards, and in FIG. 4F, the teatcup 10 the teatcup has turned completely to a state where the annular flange 12 rests against the pair of flanges 13. In this position, the teat entry end 19 is directed upwards.

In FIG. 5, the position of the teatcup 10 in the teatcup supplying member 5 according to FIG. 4C is shown for sake of clarity. Consequently, the figure illustrates the teatcup 10 resting on its annular flange 12 on said pair of flanges 13. In the surface of the teat entry end 19, there is formed an opening 20 for insertion of a teat to be milked.

Turning now to FIG. 6, the turning of teatcups 10 is shown in connection with a front view of the teatcup supplying and retrieving device 4.

Starting from the leftmost teatcup supplying member 5, the teatcup 10 is in its retracted position.

In the teatcup supplying member 5 second from the left, operation of the driving means 8 has cased the cord 7 and the pulley 6 to move downwards. The tubing 11 has run over the pulley 6 due to gravity acting on the tubing 11 and the teatcup 10. The teatcup rests against a part of the pair of flanges 13 that is inclined 16 (cf FIG. 4B).

In the teatcup supplying member 5 second from the right, operation of the driving means 8 has caused the teatcup 10 to turn such that the teat entry end is directed horizontally, as the annular flange 12 of the teatcup 10 prevents further downward movement of the teatcup. As the teatcup cannot move further, the tubing 11 is forced to bend, as shown in FIGS. 1B and 4E, respectively, which in turn causes the teatcup 10 to turn.

In the rightmost teatcup supplying member 5, operation of the driving means 8 has caused the teatcup 10 to turn to a state where the annular flange 12 of the teatcup rests against the pair of flanges 13 and the teat entry end is directed upwards.

FIG. 7 illustrates a teatcup 10 attached onto a teat of the cow. The guide roller 14 guides the tubing 11 to take a desired curved form, and to prevent it from being bent, which could stop flow through the tubing.

The guide roller 14 also guides the tubing 11 during detachment of the teatcup 10 from the teat to safely move into the member 5.

FIG. 8A illustrates the movement of the teatcup during retraction of the teatcup after detachment from the teat, which is performed by operation of the driving means 8, so that the pulley 6 is pulled upwards, causing the tubing 11 and the teatcup 10 to be retracted. Due to the pair of flanges 13 of the teatcup supplying member 5 and the annular flange 12 of the teatcup 10, the teatcup will slide against the horizontal portion 17 and upwardly (see arrow) along the inclined portion 16 thereof as the tubing 11 is retracted by the pulley 6, until the teatcup has passed the pair of flanges 13 (indicated by broken lines). Thereafter, the teatcup will move to the right (cf. FIG. 4A), depending on the horizontal position of the pulley 6.

After retraction, it may, be suitable to lower the teatcup 10 again into the position shown in FIG. 8B, in which position the interior of the tubing 11 and the teatcup 10 is cleaned by flushing a rinsing agent and water therethrough, to be let out through the opening 20 of the teatcup.

In FIG. 9, a milking stall 21 having front gate means 22 and rear gate means 23 is shown from above. The teatcup supplying and retrieving device 4 is arranged on a longitudinal bar 24 running along said milking stall 21.

OPERATION

A cow to be milked is identified by e.g. a transponder (not shown). If she is allowed to be milked, she is let into the milking stall 21 through the rear gate means 23. When the cow has entered the stall, the teatcup supplying and retrieving device 4 starts to move a teatcup 10 downwards in the sequence shown in FIGS. 4A to 4F in order to turn it.

The gripper 3a of the robot arm 3 fetches the teatcup 10 from the teatcup supplying member 5 when in the position shown in FIG. 4F. The teatcup 10 is lifted over the vertical portion 18 of the pair of flanges 13 by the robot arm 3. The robot arm moves the teatcup towards a selected teat by a teatcup locating device not shown, but may be by means of a laser sensor, an ultrasonic sensor, a vision system or the like.

The milk tube is connected to vacuum so that the teatcup can be attached to the teat (cf FIG. 7). The pulsation tube is connected to a pulsating vacuum for allowing a pulsating milk extraction to be started.

This sequence is repeated for the remaining three teatcups until each of them has been attached to a suitable teat, unless it should not be milked due to e.g. infection.

After performed milling, a suitable sensor, such as a milk flow sensor, is used for sensing a ceasing milk flow. When a control means has established end of milking outgoing from a signal from the sensor, the control means controls the driving means 8 to pull the pulley 6 for retracting the teatcup.

The teatcup is lowered into the position shown in FIG. 8B for rinsing the interior of the tubing 11 and the teatcup 10. The liquid is flushed down to the floor provided e.g. with a drain.

After rinsing is finished, the teatcup is retracted to the position shown in FIG. 4A and the cow is let out from the stall 21 by opening the front gate means 22.

The automatic milking apparatus is now ready to milk another cow.

Of course, pre-treatment and after-treatment of the teats, such as cleaning, iodine-spraying, massage and premilking, may be performed before and/or after attachment of the teatcups, which treatments are performed by moving a suitable equipment to the teats by means of the robot arm.

If it is desired to attach the teatcups 10 manually—which may be the case if the teatcup and supplying and retrieving apparatus 4 is used without the milking robot 3, or in case of a malfunction of the milking robot 3—a push-button is pressed to activate the driving means 8, either one at a time or all of them simultaneously. The teatcups will be put into the position shown in FIG. 4F, where they are easy to fetch by hand. The teatcups are then attached to the teats of the cow by a dairy maid, instead of by the robot arm 3.

After milking is finished, the teatcups will be automatically detached and retracted, as above.

Wherever reference has been made to a cow, it should be interpreted as also including any milk animal, such as a sheep, a goat, a horse or a buffalo.

What is claimed is:

1. A teatcup supplying and retrieving device comprising a teatcup supplying member and at least one teatcup connected to a tubing, said teatcup being provided with a teat entry end having a surface defining an inlet opening for a teat, characterized in that said teatcup supplying member forms a storage magazine for said teatcup before or after said teatcup is attached to a teat of an animal, and said teatcup is displaceable from a first position to a second position, in which said teat entry end is directed differently from that of the first position, wherein said teatcup is freely displaceable in relation to said teatcup supplying member during displacement between said first and second positions utilizing said teatcup supplying member, said displacement being at least initiated by a displacement means controlled by a control means.

2. A teatcup supplying and retrieving device according to claim 1, wherein said teat entry end is directed substantially downwards in said first position.

3. A teatcup supplying and retrieving device according to claim 2, wherein:

said teat entry end is directed substantially upwards in said second position;

said teatcup supplying member comprises a displacement limiting means for limiting the movement of the teatcup;

said displacement limiting means comprises a stop member at said first position;

said displacement limiting means comprises a guide means adapted to guide said teatcup towards said first position;

said guide means comprises a pair of substantially parallel guide members;

said tubing is allowed to extend between and through said pair of guide members during displacement of the teatcup between said first and second positions;

said guide members are inclined in relation to the horizontal plane, and are arranged to allow said teatcup to perform a sliding movement along a lower surface of said guide members;

said teatcup comprises a flange means adapted to be in contact with said displacement limiting means while being displaced between said first and second positions;

said flange means comprises at least one flange member forming a substantially annular flange;

said tubing is associated with said displacement means.

4. A teatcup supplying and retrieving device according to claim 3, wherein:

said teatcup is displaceable between said first and second positions by means of a tubing linking means connectable to said displacement means, which linking means is arranged between the ends of said tubing, said tubing being connected, at its end opposite to the end connected to the teatcup, to a fluid connection point, movement of said linking means substantially towards said fluid connection point causing the teatcup to be displaced downwards;

said tubing linking means comprises a pulley, about which said tubing is adapted to run;

disengagement of said displacement means causes gravity to displace said teatcup;

operation of a driving means of said displacement means causes displacement of said teatcup, said operation being controlled by said control means;

said driving means comprises a pneumatic cylinder;

said driving means comprises a pneumatic vane motor;

said teatcup is displaceable from an upper position to a position located substantially below therefrom;

said teatcup is adapted to be retrieved to said upper position by means of said displacement means after a signal from said control means.

5. An automatic milking apparatus comprising a milking robot provided with a robot arm and a teatcup supplying and retrieving device according to claim 4, characterised in that:

the milking robot arm is adapted to fetch at least one teatcup from said teatcup supplying member, the teatcup being at its second position, and to attach it onto a teat of an animal; and it further comprises a milking stall defining an animal space for receiving at least one animal, said milking robot being arranged at a longitudinal side of said milking stall in such a way that the robot arm is allowed to move into said animal space, said teatcup supplying and retrieving device being arranged at the same longitudinal side of the milking stall as the milking robot.

6. A teatcup supplying and retrieving device according to claim 1, wherein said teat entry end is directed substantially upwards in said second position.

7. A teatcup supplying and retrieving device according to claim 1, wherein said teatcup supplying member comprises a displacement limiting means for limiting the movement of the teatcup.

8. A teatcup supplying and retrieving device according to claim 7, wherein said displacement limiting means comprises a stop member at said first position.

9. A teatcup supplying and retrieving device according to claim 7, wherein said displacement limiting means comprises a guide means adapted to guide said teatcup towards said first position.

10. A teatcup supplying and retrieving device according to claim 9, wherein said guide means comprises a pair of substantially parallel guide members.

11. A teatcup supplying and retrieving device according to claim 10, wherein said tubing is allowed to extend between and through said pair of guide members during displacement of the teatcup between said first and second positions.

12. A teatcup supplying and retrieving device according to claim 10, wherein said guide members are inclined in relation to the horizontal plane, and are arranged to allow said teatcup to perform a sliding movement along an upper surface of said guide members.

13. A teatcup supplying and retrieving device according to claim 12, wherein said guide members are arranged to allow said teatcup to perform a sliding movement along a lower surface of said guide members.

14. A teatcup supplying and retrieving device according to claim 7, wherein said teatcup comprises a flange means adapted to be in contact with said displacement limiting means while being displaced between said first and second positions.

15. A teatcup supplying and retrieving device according to claim 14, wherein said flange means comprises at least one flange member forming a substantially annular flange.

16. A teatcup supplying and retrieving device according to claim 1, wherein said tubing is associated with said displacement means.

17. A teatcup supplying and retrieving device according to claim 1, wherein said teatcup is displaceable between said first and second positions by means of a tubing linking means connectible to said displacement means, which linking means is arranged between the ends of said tubing, said tubing being connected, at its end opposite to the end connected to the teatcup, to a fluid connection point, movement of said linking means substantially towards said fluid connection point causing the teatcup to be displaced downwards.

18. A teatcup supplying and retrieving device according to claim 17, wherein said tubing linking means comprises a pulley, about which said tubing is adapted to run.

19. A teatcup supplying and retrieving device according to claim 1, wherein disengagement of said displacement means causes gravity to displace said teatcup.

20. A teatcup supplying and retrieving device according to claim 1, wherein operation of a driving means of said displacement means causes displacement of said teatcup, said operation being controlled by said control means.

21. A teatcup supplying and retrieving device according to claim 20, wherein said driving means comprises a pneumatic cylinder.

22. A teatcup supplying and retrieving device according to claim 21, wherein said driving means comprises a pneumatic vane motor.

23. A teatcup supplying and retrieving device according to claim 1, wherein said teatcup is displaceable from an upper position to a position located substantially below therefrom.

24. A teatcup supplying and retrieving device according to claim 23, wherein said teatcup is adapted to be retrieved to said upper position by means of said displacement means after a signal from said control means.

25. A teatcup supplying and retrieving device according to claim 23, wherein said position located substantially below said upper position comprises said first position.

26. An automatic milking apparatus comprising a milking robot provided with a robot arm and a teatcup supplying and retrieving device according to claim 1, characterised in that the milking robot arm is adapted to fetch at least one teatcup from said teatcup supplying member, the teatcup being at its second position, and to attach it onto a teat of an animal.

27. An automatic milking apparatus according to claim 26, wherein it further comprises a milking stall defining an animal space for receiving at least one animal, said milking robot being arranged at a longitudinal side of said milking stall in such a way that the robot arm is allowed to move into said animal space, said teatcup supplying and retrieving device being arranged at the same longitudinal side of the milking stall as the milking robot.

28. A teatcup supplying and retrieving device comprising:
   at least one teatcup and tubing connected to the teatcup, the teatcup having a teat entry end having a surface defining an inlet opening for a teat; and
   a teatcup supplying member comprising:
      a teatcup storage magazine disposed to store the teatcup in a first position,
      a guide assembly, the teatcup being freely displaceable along the guide assembly from the first position to a second position in which the teat entry end is directed differently from when the teatcup is in the first position, and
      a displacement initiator operative to initiate displacement of the teatcup from the first position to the second position.

29. The teatcup supplying and retrieving device of claim 28, wherein the teat entry end is directed substantially downwards in the first position.

30. The teatcup supplying and retrieving device of claim 28, wherein the teat entry end is directed substantially upwards in the second position.

31. The teatcup supplying and retrieving device of claim 28, wherein the guide assembly comprises a pair of guide members configured to guide the teatcup between the first position and the second position.

32. The teatcup supplying and retrieving device of claim 28, wherein the guide assembly comprises a pair of guide members having a surface inclined from a horizontal plane and configured to allow the teatcup to slide along the inclined surface.

33. The teatcup supplying and retrieving device of claim 32, wherein the guide assembly further comprises a stop member at the first position.

34. The teatcup supplying and retrieving device of claim 32, wherein the teatcup further comprises a flange adapted to contact the inclined surface.

35. The teatcup supplying and retrieving device of claim 32, wherein the tubing extends between and through the pair of guide members during displacement of the teatcup between the first and second positions.

36. The teatcup supplying and retrieving device of claim 35, wherein the displacement initiator is connectable to the tubing to initiate displacement of the teatcup.

37. The teatcup supplying and retrieving device of claim 28, wherein the displacement initiator is operative to disengage to allow gravity to displace the teatcup.

38. The teatcup supplying and retrieving device of claim 28, wherein the displacement initiator includes a driver operative to cause displacement of the teatcup.

39. The teatcup supplying and retrieving device of claim 28, further comprising a controller in operative communication with the displacement initiator.

* * * * *

UNITED STATES PATENT AND TRADEMARK OFFICE
CERTIFICATE OF CORRECTION

PATENT NO. : 6,357,387 B1
DATED : March 19, 2002
INVENTOR(S) : Leif Börje Johannesson It is certified that error appears in the above-identified patent and that said Letters Patent is hereby corrected as shown below:

Column 5,
Line 8, "cf" should read -- cf. --; and

Column 6,
Line 8, "milling" should read -- milking --.

Signed and Sealed this

First Day of July, 2003

JAMES E. ROGAN
*Director of the United States Patent and Trademark Office*